(12) United States Patent
Oh

(10) Patent No.: US 6,344,723 B1
(45) Date of Patent: Feb. 5, 2002

(54) DEVICE AND METHOD FOR CONTROLLING A WASHING MACHINE

(75) Inventor: Min Jin Oh, Kyongsangam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/592,564

(22) Filed: Jun. 12, 2000

(30) Foreign Application Priority Data

Jun. 15, 1999 (KR) .............................. 99-22386
Jun. 15, 1999 (KR) .............................. 99-22387

(51) Int. Cl.$^7$ .............................................. G05B 11/01
(52) U.S. Cl. ........................ 318/560; 318/567; 318/569; 318/3
(58) Field of Search ................................ 318/560, 567, 318/569, 3; 68/23.7, 23.6; 251/129.12

(56) References Cited

U.S. PATENT DOCUMENTS

| | | | |
|---|---|---|---|
| 4,741,508 A | 5/1988 | Fukamachi | 251/71 |
| 4,782,544 A | 11/1988 | Nystuen et al. | 8/159 |
| 5,088,902 A | 2/1992 | Marioni | 417/415 |
| 5,551,261 A | * 9/1996 | Lyu et al. | 68/23.6 |
| 5,568,911 A | * 10/1996 | Kim | 251/129.12 |
| 5,946,946 A | 9/1999 | Sharp et al. | 68/23.1 |
| 6,176,108 B1 | * 1/2001 | Bae et al. | 68/23.7 |
| 6,182,674 B1 | * 2/2001 | Jozwiak et al. | 68/23.7 |

* cited by examiner

Primary Examiner—Karen Masih
(74) Attorney, Agent, or Firm—Fleshner & Kim, LLP

(57) ABSTRACT

Device and method for controlling a drain motor, in which a drain valve is driven with reference to a position of drain valve, for optimal control of the drain motor, the device including a drain motor cam connected to a shaft of the drain motor having a detecting point for detecting a bottom dead center of a drain valve marked on one region of a circumference thereof, a switching unit for detecting a position of detecting point of the drain motor cam when the drain motor cam is rotated to provide a position detecting signal, and a microcomputer for receiving the position detecting signal from the switching unit, to identify a position of the drain valve, and controlling operation of the drain motor according to a result of the identification.

10 Claims, 7 Drawing Sheets

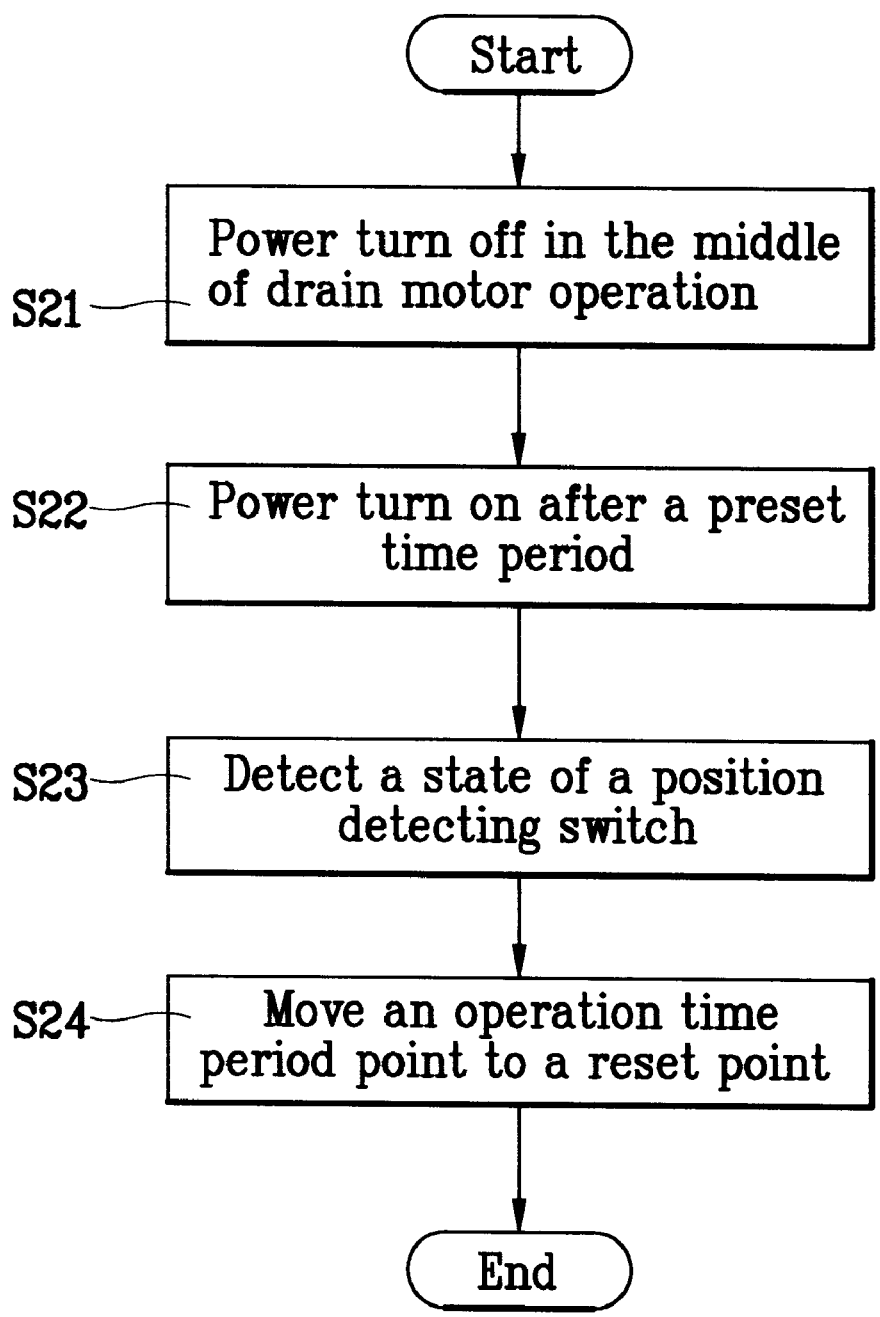

DEVICE AND METHOD FOR CONTROLLING A WASHING MACHINE

BACKGROUND OF THE INVENTION

1. Field of the Invention

The present invention relates to device and method for controlling a drain motor in a fully automatic washing machine, and more particularly, to device and method for controlling a drain motor, in which a drain valve is driven with reference to a position of drain valve, for optimal control of the drain motor.

2. Background of the Invention

Though the dirt on clothes is removed by chemical reaction of detergent in the washing water once the clothes is put into the washing water, the washing machine for removing dirt stuck on clothes exerts mechanical action, such as friction or vibration, to the clothes for accelerating removal of the dirt, because the removal of dirt from the clothes only by the action of the detergent takes a long time.

In operating the washing machine, first, a washing mode is conducted, in which a quantity of laundry, such as clothes, introduced into a washing tub is detected to determine the quantity of laundry, water flow, detergent, and a total washing time period are set according to the quantity of laundry, and the pulsator is pulsated according to the total washing time period, to circulate the washing water for removing the dirt on the clothes through friction with the laundry. Then, upon completion of the washing mode, a rinsing mode is conducted, in which dirt water in the washing tub is discharged, fresh water is supplied to the washing tub, rinsing is carried out for a preset time set in the system already. Upon completion of the rinsing mode, a spinning mode is conducted, in which the water in the washing tub is discharged, and the induction motor is rotated at a preset high speed, for removing water from the laundry by centrifugal force. During the washing and rinsing modes, a drain vale is held closed, and during the spinning mode, the drain valve is held open.

FIG. 1 illustrates a bottom view showing a related art drain motor and drain valve.

During the washing and rinsing modes of the washing machine, the drain motor 30 is held turned off, and the drain valve 33 is kept closed, for not draining the washing water. In this state, a brake lever 32 interlocked with a connection link 31 transmitting an action of the drain motor 30 to the drain valve 33 is disposed at a position where a brake band (not shown) fixes a drain shaft (not shown) according to a position of the connection link, and since a fore end of a clutch lever 12 is to pull an end of a clutch spring 16, to bring the spring into a state in which a diameter of the clutch spring 16 becomes greater than an original diameter, that releases the clutch 20, the washing shaft connected to the pulsator is free from the spinning shaft connected to the washing tub. In the spinning mode, the drain motor 30 is put into operation, to retract the connection link 31 backward, and to open the drain valve 33, leaving the washing water in a state to be drained, and on the same time, the retraction of the connection link 31 moves the brake lever 32 also to release the spinning shaft from the brake band, and the backward movement of the brake band pushes a connecting screw, to release the clutch lever 12 having the connecting screw fastened thereto to restore the clutch spring 16 into an original state, thereby permitting the washing shaft and the spinning shaft engaged. There are washing machines provided with two step drain valve and drain motor as the case requires. That is, during draining, a voltage is provided to the drain motor 30, to drive the brake lever 32 of the clutch 20 and the drain valve 33 on the same time, and upon finish of the draining, the voltage to the drain motor 30 is cut off, to restore the drain valve 33 automatically by the clutch spring 16 attached to the drain valve 33. However, the large sized motor coming from a high power required for driving the brake lever 32 and the drain valve 33 on the same time in draining in the related art costs high and occupies a large space.

SUMMARY OF THE INVENTION

Accordingly, the present invention is directed to device and method for controlling a drain motor that substantially obviates one or more of the problems due to limitations and disadvantages of the related art.

An object of the present invention is to provide device and method for controlling a drain motor, in which a drain motor is adapted to be controlled in an optimal condition to permit a small sized motor, for reducing cost and a space occupied by the drain motor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for controlling a drain motor includes a drain motor cam connected to a shaft of the drain motor having a detecting point for detecting a bottom dead center of a drain valve marked on one region of a circumference thereof, a switching unit for detecting a position of detecting point of the drain motor cam when the drain motor cam is rotated to provide a position detecting signal, and a microcomputer for receiving the position detecting signal from the switching unit, to identify a position of the drain valve, and controlling operation of the drain motor according to a result of the identification.

In other aspect of the present invention, there is provided a method for controlling a drain motor, including the steps of (1) initializing the drain motor for detecting a bottom dead center of a drain valve, (2) measuring a time period while operating the drain motor once the bottom dead center of the drain valve is detected, (3) stopping the drain motor and carrying out drain operation if the time period measured in the step (2) is the same with a preset motor stop time period, and (4) returning the drain valve to an original state to the bottom dead center of the drain valve upon completion of the rain operation in the step (3).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

First Embodiment

Figure 1:
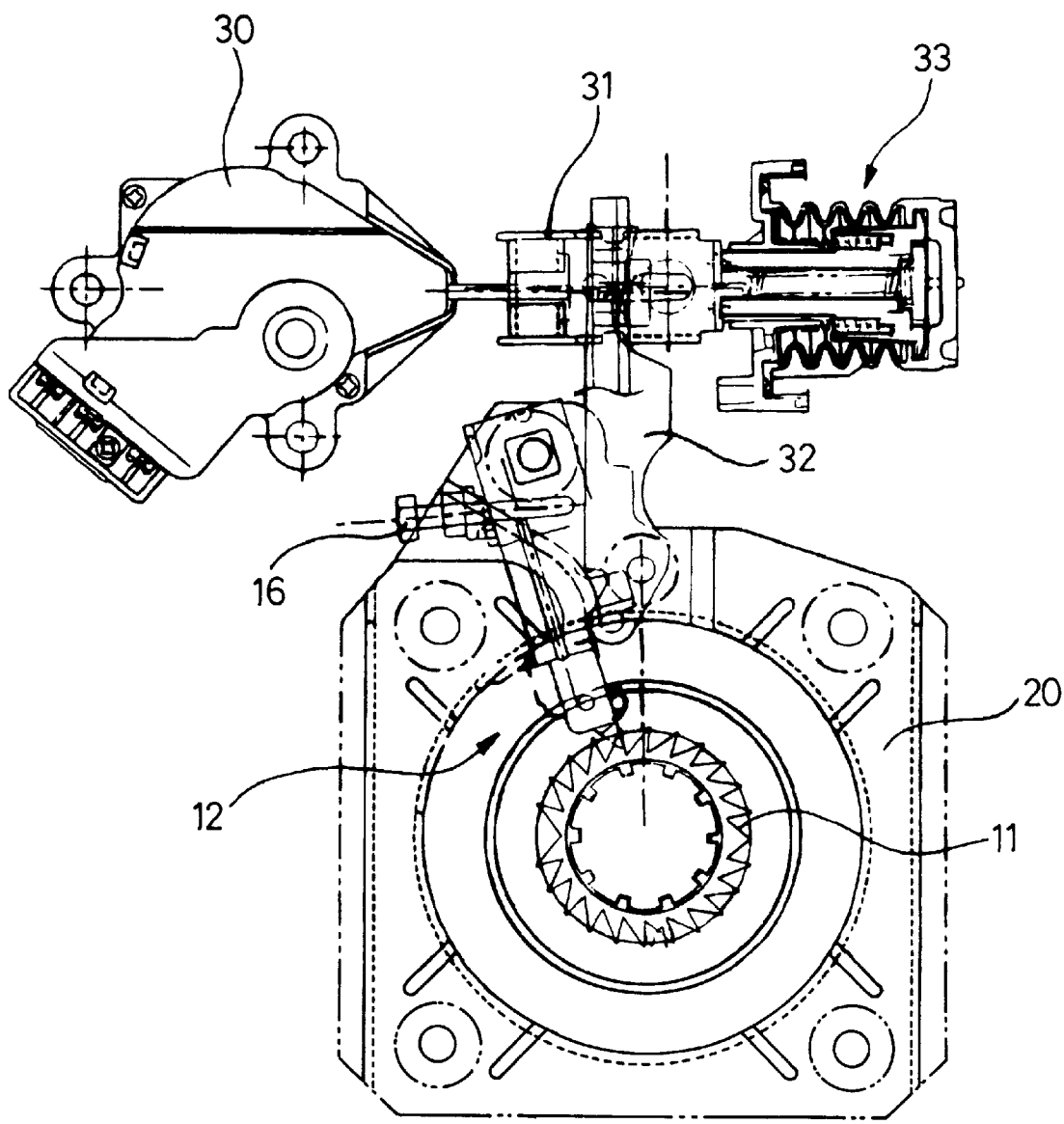
FIG. 1 illustrates a bottom view showing a related art drain motor and drain valve.
Figure 2:
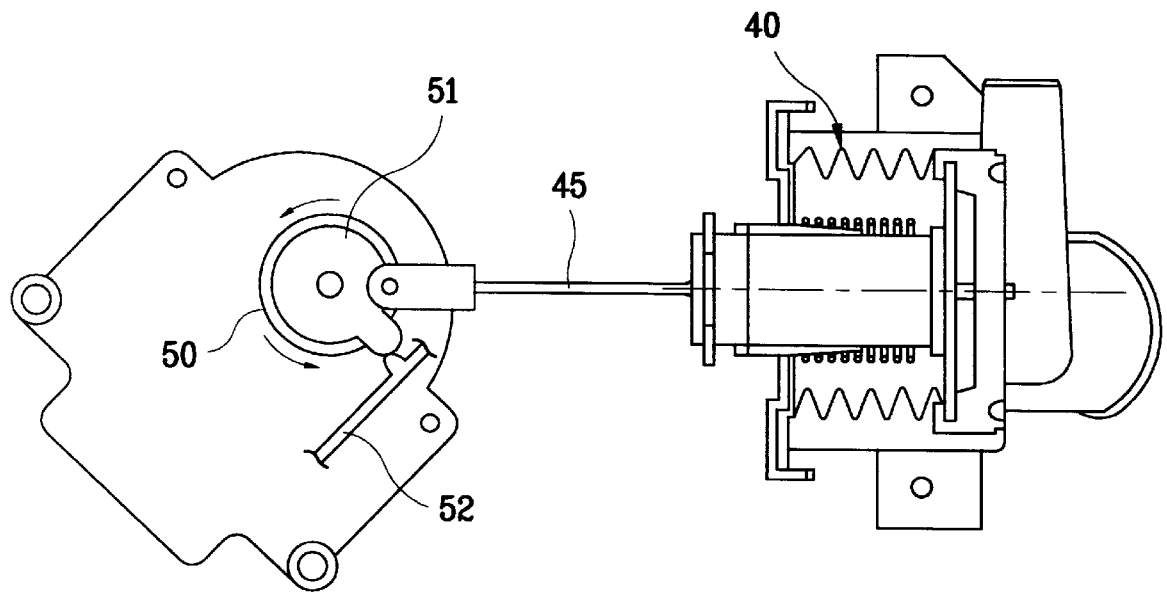
FIG. 2 illustrates a device for controlling a drain motor in accordance with a first preferred embodiment of the present invention.
Figure 3:
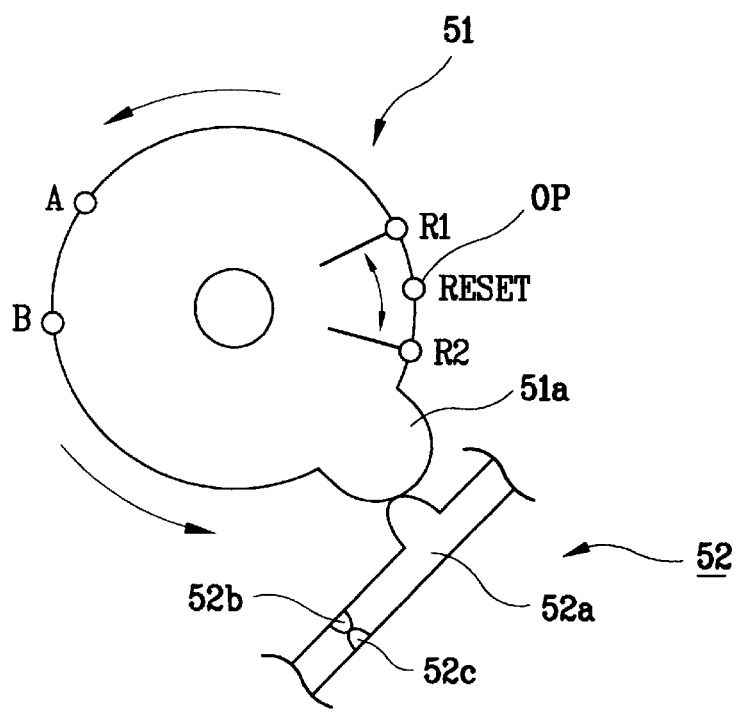
FIG. 3 illustrates an enlarged view of the drain motor cam and the switch shown in FIG. 2.
Figure 4:
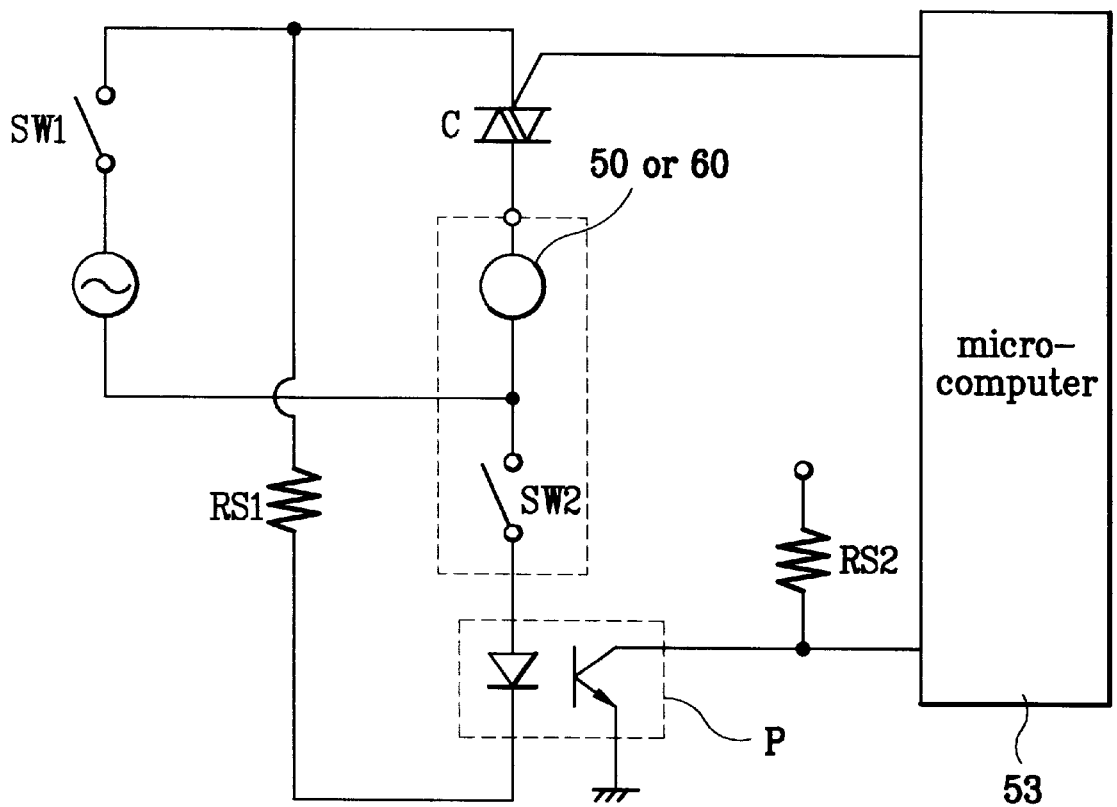
FIG. 4 illustrates a circuit for controlling a drain motor in accordance with a preferred embodiment of the present invention.

FIG. 2 illustrates a device for controlling a drain motor in accordance with a first preferred embodiment of the present invention, FIG. 3 illustrates an enlarged view of the drain motor cam and the switch shown in FIG. 2, and FIG. 4 illustrates a circuit for controlling a drain motor in accordance with a preferred embodiment of the present invention.

Referring to FIGS. 2 to 4, the device for controlling a drain motor in accordance with a first preferred embodiment of the present invention includes a drain motor 50 for being rotated in response to an external control signal, a rod 45 for transmission of a power of the drain motor 50 to a drain valve 40, a drain motor cam 51 fitted to the drain motor 50 having a projection 51a for identifying a position (bottom dead center) of the drain valve 40, a position detecting switch 52 adapted to be turned on/off by the projection 51a on the drain motor cam 51 for generating a position detecting signal that permits to identify a state of the drain motor cam 51, and a microcomputer 53 for receiving the position detecting signal from the position detecting switch 52, and controlling operation of the drain motor 50 according to a result of the identification. Particularly, the position detecting switch 52 includes two pieces, of which one piece has one side with a convex portion 52a for contact with the projection 51a on the drain motor cam 51, and both pieces have insides with first and second contact portions 52b and 52c at opposite positions. That is, the position detecting switch 52 includes a first piece having a convex portion for contact with the projection on the drain motor cam, and a second piece opposite to the first piece, with contact portions formed insides of the first and second pieces, respectively. Therefore, when the convex portion 52a of the position detecting switch 52 is brought into contact with the projection 51a on the drain motor cam 51, the first and second contact portions 52b and 52c come into contact, to turn on the position detecting switch 52.

The microcomputer 53 controls operation of the drain motor 50 depending on a position of an operation point OP of the drain valve a state of which is determined according to rotation of the drain motor cam 51 according to rotation of the drain motor 50.

That is, referring to FIG. 3, the operation point OP of the drain valve 40 is positioned between R1 point and R2 point. And, there are 'A' point and 'B' point along a direction of rotation of the drain motor 50 next to the RI point, wherein 'A' point denotes a motor stop point, informing that the drain valve 40 is put into operation and the drain motor 50 is stopped, and the B point next to the 'A' point denotes a drain valve 40 top dead center informing that the drain valve 40 is fully opened. When a system power is turned on again after being turned off for a while in the middle of operation of the drain motor 50, since the operation point OP is always reset to a reset point between the R1 and R2 points, the operation point OP is positioned at the reset point in an initial operation of the drain motor 60. If the operation point OP is positioned between the R2 point~reset point~R1 point, the first and second contact points 52b and 52c of the position detecting switch 52 are under a state of contact to each other, which denotes a contact point turn on section, and, if the operation point OP is positioned between the R1 point ~A point~B point~R2 point, the first and second contact points 52b and 52c of the position detecting switch 52 are in a state spaced apart from each other, which denotes a contact point turn off section.

Referring to FIG. 4, in order to detect the present position of the drain motor cam 51, a photocoupler 'P' is used. The unexplained reference symbol SW1 in FIG. 4 represents a power switch, and the reference symbol SW2 represents the position detecting switch 52 explained above. And, the references symbols RS1 and RS2 and C denote resisters and a condenser.

The operation of the device for controlling a drain motor in accordance with a first embodiment of the present invention will be explained.

In an initial operation of the drain motor 50, the operation point OP is positioned at the reset point (a bottom dead center of the drain valve), and the position detecting switch 52 is positioned within the contact point turn on section. As the drain motor 50 is operated, the operation point OP passes through the R1 point along the direction 'R' of rotation of the drain motor 50 when the first and second contact points 52b and 52c come apart, to turn off the position detecting switch 52. Then, the position detecting switch 52 generates a position detecting signal for identifying the present position of the operation point OP and provides to the microcomputer 53, and the microcomputer 53 measures a moving time period of the operation point OP for controlling the operation of the drain motor 50, and compares to a motor stop duration ΔT set already in the system. If the measured time period and the motor stop time period is identical, the microcomputer 53, determining that the operation point OP is positioned at the 'A' point at the present time, stops the drain motor 50 and, on the same time, starts draining of the water through the drain valve 40. After conducting the draining operation for a preset time period, determining that the draining operation is completed, the microcomputer 53 puts the drain motor 50 into operation again, to restore the drain valve 40 to an original state again, as well as to bring the operation point OP to the initial position, i.e., to the reset point, too.

Figure 7:
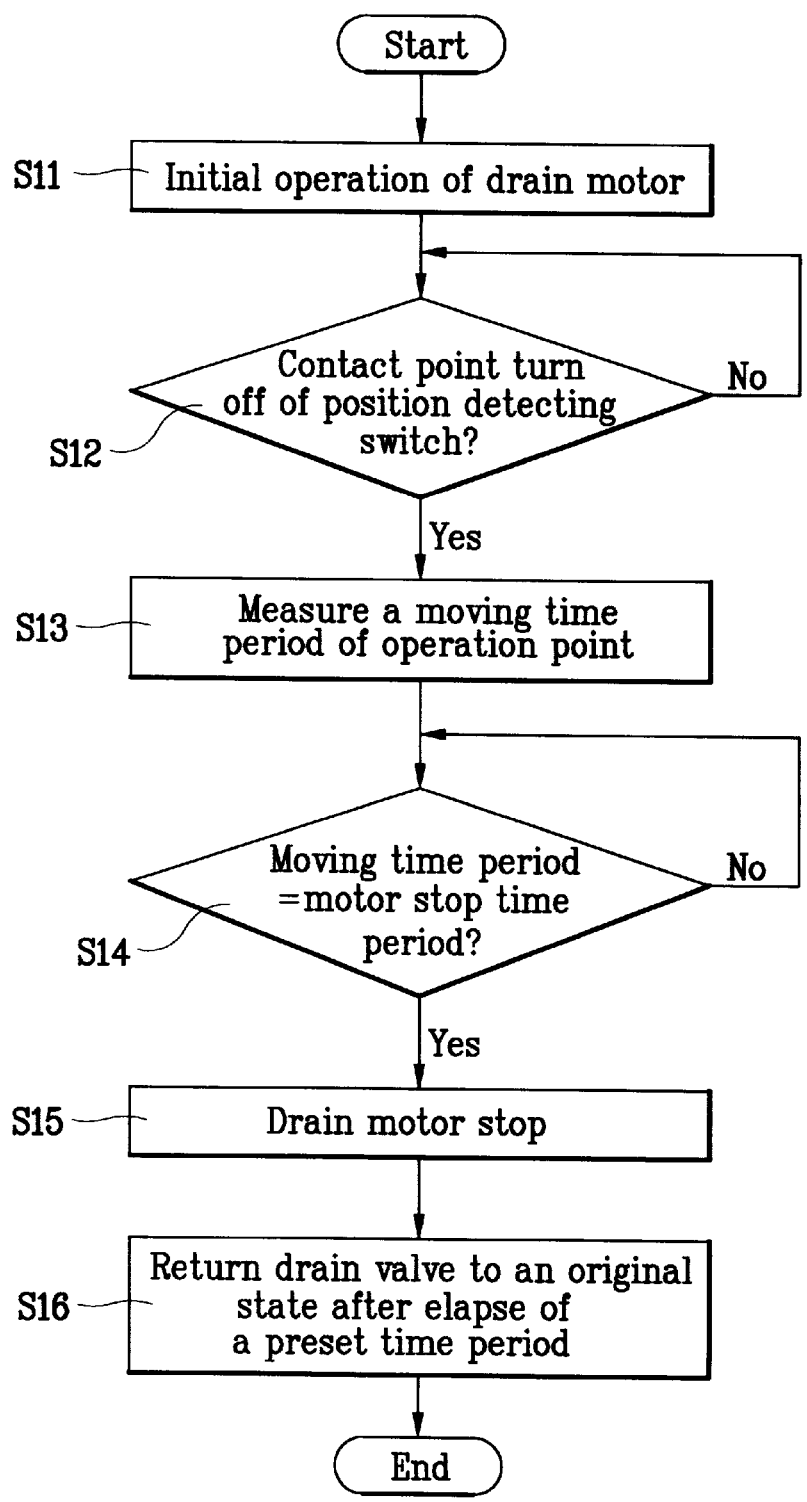
FIG. 7 illustrates a flow chart showing the steps of a method for controlling a drain motor in accordance with a preferred embodiment of the present invention.

A method for controlling the aforementioned device for controlling a drain motor in accordance with a first preferred embodiment of the present invention will be explained. FIG. 7 illustrates a flow chart showing the steps of a method for controlling a drain motor in accordance with a first preferred embodiment of the present invention, and FIG. 9 illustrates a flow chart showing the steps of a method for initializing a drain motor in accordance with a preferred embodiment of the present invention.

Referring to FIG. 7, method for controlling a drain motor in accordance with a preferred embodiment of the present invention starts with determining a first and a second contact portions 52b and 52c of the position detecting switch 52 of being spaced apart from each other (see S11 and S12) as an operation point OP of the drain valve 40 passes through the R1 point after the drain motor 50 is put into operation initially, to bring the drain valve to a bottom dead center (S11). If it is determined in the step S12 that the first and the second contact portions 52b and 52c of the position detecting switch 52 are spaced apart from each other, the position detecting switch 52 provides a contact point turn off signal. Accordingly, the microcomputer 53 measures a moving time period of the operation point OP (see S13). Then, the moving time period of the operation point OP measured at the step S13 is determined of being identical to the motor stop time period ΔT set already in the system (see S14). That is, if the moving time period of the operation point OP is shorter than the motor stop time period ΔT set already in the system, the motor is operated until identical, to bring the moving time period of the operation point OP to be identical to the motor stop time period. Therefore, when the moving time period of the operation point OP is identical to the motor stop time period ΔT set already in the system, the operation point OP is determined to be positioned at the 'A' point at the present time, the water is drained through the drain valve 40, and the drain motor 50 is stopped. (see S15). Finally, after elapse of a preset time period, it is determined that the draining operation is completed, to restore the drain valve 40 into an original state as well as to return the operation point OP of the drain motor cam 51 to an initial position. (see S16) Of the steps in the method for controlling a drain motor, the system should be initialized for operating the drain motor 50 in the step S11. As shown in FIG. 9, in order to do this, the system is turned off, and, after for a while, turned on in the middle of operation of the drain motor 50 in the steps 1 and 2. (see S21 and S22) And, in the step 3, a state of the position detecting switch 52 is detected, for determining a position of the operation point OP at the present time; if the position detecting switch 52 is in operation, the operation point OP is determined to be on a position of the contact point turn on section (R2 point ~reset point~R1 point), and if the position detecting switch 52 is not in operation, it is determined that the operation point OP is positioned on a position of the contact turn off section (R1 point~A point~B point~R2 point). (see S23) Thereafter, in the step 4, according to a result of determination in the step 3(S23), the operation point OP is made to be positioned at the reset point. (see S24)

Second Embodiment

Figure 5:
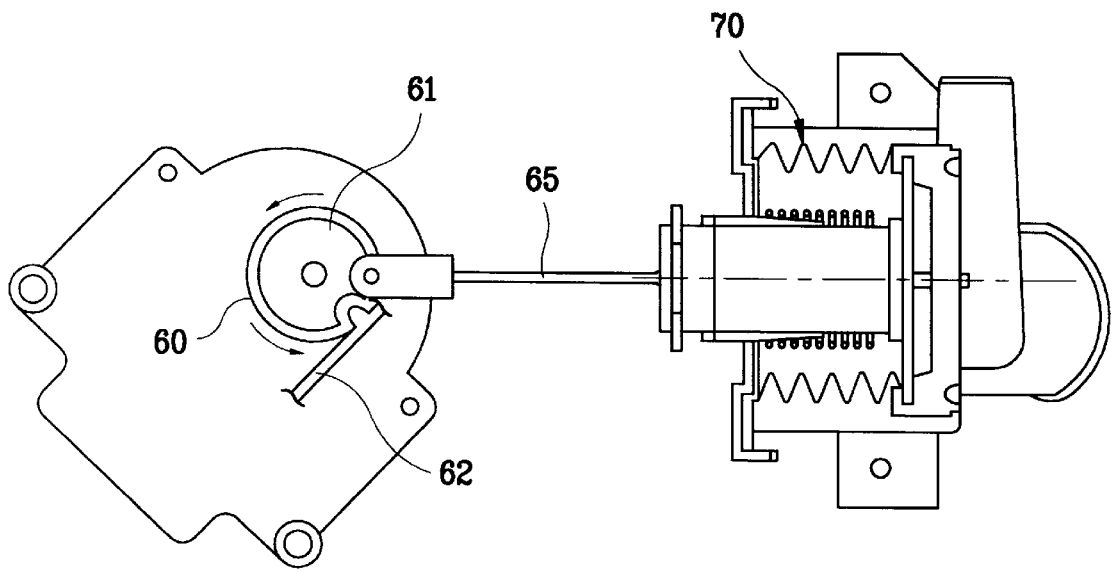
FIG. 5 illustrates a device for controlling a drain motor in accordance with a second preferred embodiment of the present invention.
Figure 6:
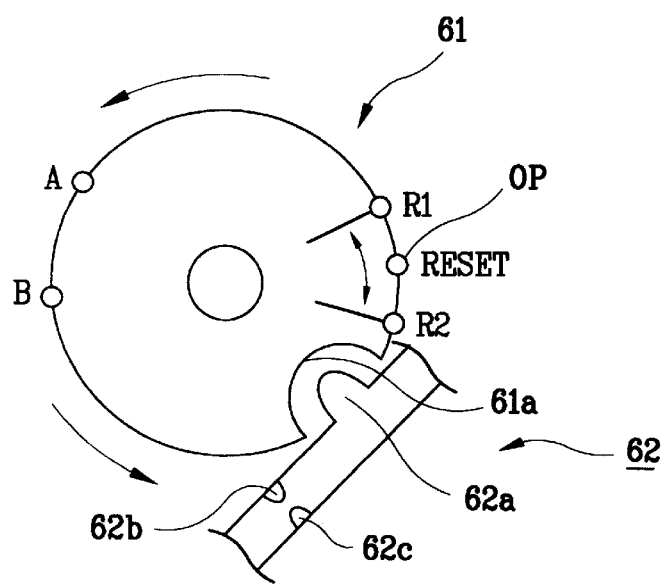
FIG. 6 illustrates an enlarged view of the drain motor cam and the switch shown in FIG. 5.

FIG. 5 illustrates a device for controlling a drain motor in accordance with a second preferred embodiment of the present invention, and FIG. 6 illustrates an enlarged view of the drain motor cam and the switch shown in FIG. 5.

Referring to FIGS. 5 and 6, the device for controlling a drain motor in accordance with a second preferred embodiment of the present invention, in which a recess 61a is formed in a drain motor cam 61, includes a drain motor 60 for being rotated in response to an external control signal, a rod 65 for transmission of a power of the drain motor 60 to a drain valve 70, a drain motor cam 61 fitted to the drain motor 60 having a recess 61a for identifying a position (a bottom dead center) of the drain valve 70, and a position detecting switch 62 adapted to be turned on/off by the recess 61a in the drain motor cam 61 for generating a position detecting signal that permits to identify a state of the drain motor cam 61. Particularly, the position detecting switch 62 includes two pieces, of which one piece has one side with a convex portion 62a for contact with the recess 61a in the drain motor cam 61, and both pieces have insides with first and second contact portions 62b and 62c at opposite positions. Therefore, when the convex portion 62a on the position detecting switch 62 is brought into contact with the recess 61a in the drain motor cam 61, the first and second contact portions 62b and 62c are spaced apart, to turn off the position detecting switch 62. Alike the first preferred embodiment of the present invention, the position detecting signal from the position detecting switch 62 is provided to the microcomputer 53 shown in FIG. 4. Therefore, the microcomputer 53 controls operation of the drain motor 60 depending on a position of an operation point OP of the drain valve 70 a state of which is determined according to rotation of the drain motor cam 61 according to rotation of the drain motor 60.

That is, referring to FIG. 6, the operation point OP of the drain valve 70 is positioned between R1 point and R2 point. And, there are 'A' point and 'B' point along a direction of rotation of the drain motor 60 next to the R1 point, wherein 'A' point denotes a motor stop point, informing that the drain valve 70 is put into operation and the drain motor 60 is stopped, and the B point next to the 'A' point denotes a drain valve 70 top dead center, informing that the drain valve 70 is fully opened. When a system power is turned on again after being turned off for a while in the middle of operation of the drain motor 60, since the operation point OP is always reset to a reset point between the R1 and R2 points, the operation point OP is positioned at the reset point in an initial operation of the drain motor 60. If the operation point OP is positioned between the R2 point~reset point~R1 point, the first and second contact points 62b and 62c of the position detecting switch 62 are under a state spaced apart from each other, which denotes a contact point turn off section, and, if the operation point OP is positioned between the R1 point ~A point~B point~R2 point, the first and second contact points 62b and 62c of the position detecting switch 62 are in a state of contact to each other, which denotes a contact point turn on section.

The operation of the device for controlling a drain motor in accordance with a second embodiment of the present invention will be explained.

In an initial operation of the drain motor 60, the operation point OP is positioned at the reset point, and the position detecting switch 62 is positioned within the contact point turn off section. As the drain motor 60 is operated, the operation point OP passes through the R1 point along the direction of rotation of the drain motor 60 when the first and second contact points 62b and 62c come apart, to turn on the position detecting switch 62. Then, the position detecting switch 62 generates a position detecting signal for identifying the present position of the operation point OP and provides to the microcomputer 53, and the microcomputer 53 measures a moving time period of the operation point OP for controlling the operation of the drain motor 60, and compares to a motor stop duration ΔT set already in the system. If the measured time period and the motor stop time period is identical, the microcomputer 53, determining that the operation point OP is positioned at the 'A' point at the present time, stops the drain motor 60 and, on the same time, starts draining of the water through the drain valve 70. After conducting the draining operation for a preset time period, determining that the draining operation is completed, the microcomputer 53 puts the drain motor 60 into operation again, to restore the drain valve 70 to an original state again, as well as to bring the operation point OP to the initial position, i.e., to the reset point, too.

Figure 8:
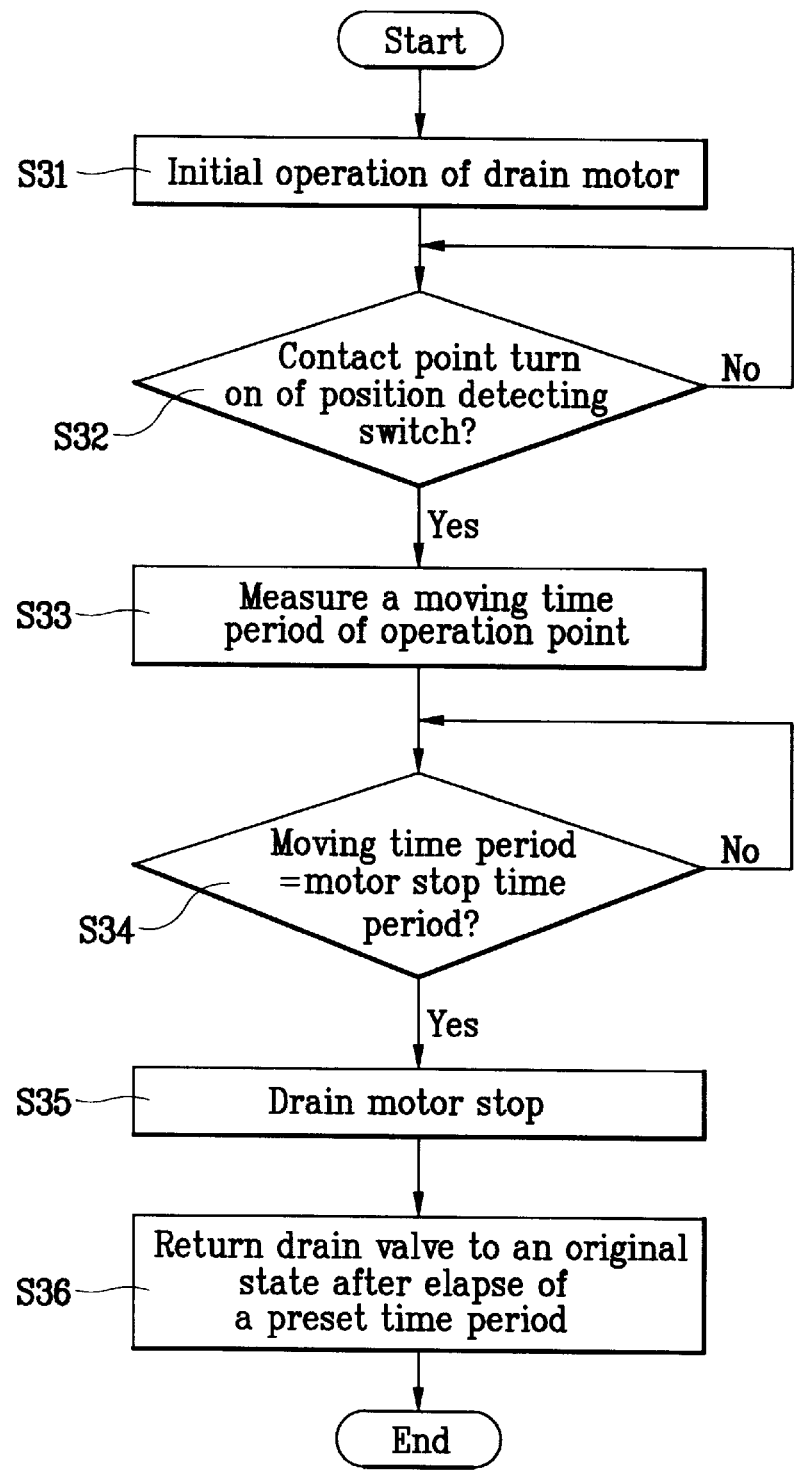
FIG. 8 illustrates a flow chart showing the steps of a method for initializing a drain motor in accordance with a preferred embodiment of the present invention; and, FIG. 9 illustrates a flow chart showing the steps of a method for initializing a drain motor in accordance with a preferred embodiment of the present invention.

A method for controlling the aforementioned device for controlling a drain motor in accordance with a second preferred embodiment of the present invention will be explained. FIG. 8 illustrates a flow chart showing the steps of a method for controlling a drain motor in accordance with a second preferred embodiment of the present invention.

Referring to FIG. 8, a method for controlling a drain motor in accordance with a second preferred embodiment of the present invention starts with determining a first and a second contact portions 62b and 62c of the position detecting switch 62 of being in contact with each other (see S32) as an operation point OP of the drain valve 70 passes through the R1 point after the drain motor 60 is put into operation initially (S31). If it is determined in the step S32 that the first and the second contact portions 62b and 62c of the position detecting switch 62 are spaced apart from each other, the position detecting switch 62 provides a contact point turn on signal. Accordingly, the microcomputer 53 measures a moving time period of the operation point OP (see S33). Then, the moving time period of the operation point OP measured at the step S33 is determined of being identical to the motor stop time period ΔT set already in the system (see S34). That is, if the moving time period of the operation point OP is shorter than the motor stop time period ΔT set already in the system, the motor is operated until identical, to bring the moving time period of the operation point OP to be identical to the motor stop time period. Therefore, when the moving time period of the operation point OP is identical to the motor stop time period ΔT set already in the system, the operation point OP is determined to be positioned at the 'A' point at the present time, the water is drained through the drain valve 70, and the drain motor 60 is stopped. (see S35). Finally, after elapse of a preset time period, it is determined that the draining operation is completed, to restore the drain valve 70 into an original state as well as to return the operation point OP of the drain motor cam 61 to an initial position. (see S36) Of the steps in the method for controlling a drain motor in accordance with a second preferred embodiment of the present invention, the system should be initialized for operating the drain motor 60 in the step S31, which is identical to the method explained in connection with FIG. 9. That is, the system is turned off, and, after for a while, turned on again in the middle of operation of the drain motor 60. (see S21 and S22) And, a state of the position detecting switch 62 is detected, for determining a position of the operation point OP at the present time; if the position detecting switch 62 is in a turn off state, the operation point OP is determined to be on a position of the contact point turn on section (R2 point~reset point~R1 point), and if the position detecting switch 62 is in a turn on state, it is determined that the operation point OP is positioned on a position of the contact turn on section (R1 point~A point~B point~R2 point). (see S23) Thereafter, in the step 4, according to a result of determination in the step 3 (S23), the operation point OP is made to be positioned at the reset point. (see S24)

As has been explained, the device and method for controlling a drain motor of the present invention have the following advantages.

First, the optimal control of the drain motor by detecting a position of the drain valve in operation of the drain valve by the drain motor permits to use a small sized motor.

Second, the permitted use of a small sized motor permits to reduce cost and a space occupied by the motor.

It will be apparent to those skilled in the art that various modifications and variations can be made in the device and method for controlling a drain motor of the present invention without departing from the spirit or scope of the invention. Thus, it is intended that the present invention cover the modifications and variations of this invention provided they come within the scope of the appended claims and their equivalents.

What is claimed is:

1. A device for controlling a drain motor, comprising:

a drain motor cam connected to a shaft of the drain motor and having a detecting point indicating a bottom dead center of a drain valve marked on one region of a circumference thereof;

a switching unit for detecting a position of the detecting point of the drain motor cam when the drain motor cam is rotated and for providing a position detecting signal; and a microcomputer for receiving the position detecting signal from the switching unit identifying a position of the drain valve, and for controlling operation of the drain motor according to a result of the identification.

2. The device as claimed in claim 1, wherein the drain motor cam has a projection at the detection point.

3. The device as claimed in claim 1, wherein the drain motor cam has a recess at the detection point.

4. The device as claimed in claim 1, wherein the switching unit includes:

a first piece having a projection configured to contact with the detecting point on the drain motor cam; and a second piece opposite to the first piece, wherein contact point portions are formed on insides of the first and second pieces.

5. The device as claimed in claim 1, wherein the microcomputer detects a state of the switching unit thereby detecting a position of the drain valve at the present time, and measures the time taken to detect a stop time point of the drain motor, and a return time point of the drain valve, for controlling operation of the drain motor.

6. A method for controlling a drain motor, comprising:

(1) initializing the drain motor and detecting a bottom dead center of a drain valve;

(2) measuring a time period while operating the drain motor once the bottom dead center of the drain valve is detected;

(3) stopping the drain motor and carrying out a drain operation if the time period measured in step (2) is the same as a preset motor stop time period; and (4) returning the drain valve to an original state of the bottom dead center of the drain valve upon completion of the drain operation in the step (3).

7. The method as claimed in claim 6, wherein step (1) includes putting the drain motor into operation by moving the drain valve to a bottom dead center of the drain valve, when a system power is turned on after the system power has been turned off for a while.

8. A method for controlling a washing machine, the washing machine including a drain motor cam connected with a shaft of a drain motor that rotates along with the drain motor, a switch having a contact point which is turned on/off by rotation of the drain motor cam, and a microcomputer that detects a position of the drain valve in response to a position detecting signal from the switch and that controls driving of the drain motor in accordance with the detected position, the method comprising:

(1) storing in a microcomputer, a reference time period, which is the time taken by the drain motor cam to reach a position where the drain valve is opened, as the drain motor is rotated;

(2) rotating the drain motor to rotate the drain motor cam in one direction based on an operation point if a drain start signal is applied from the microcomputer;

(3) stopping rotation of the drain motor when the reference time period is measured;

(4) maintaining an off-state of the drain motor during a drain operation;

(5) again rotating the drain motor after the drain operation is completed; and (6) detecting a change in the state of the contact points of the switch, which results from rotation of the drain motor cam, and then turning off the drain motor.

9. The method according to claim 8, further comprising, prior to rotating the drain motor, initiating the drain motor and detecting a bottom dead center position of a drain valve.

10. The method according to claim 9, further comprising returning the drain motor cam to a reset position, wherein the drain valve is in a bottom dead center position.

* * * * *